(12) United States Patent
Tanaka

(10) Patent No.: US 7,224,479 B2
(45) Date of Patent: May 29, 2007

(54) IMAGE FORMING APPARATUS IN USE WITH A NETWORK

(75) Inventor: Kazuyoshi Tanaka, Tokyo (JP)

(73) Assignee: Konica Corporation, Tokyo (JP)

( * ) Notice: Subject to any disclaimer, the term of this patent is extended or adjusted under 35 U.S.C. 154(b) by 911 days.

(21) Appl. No.: 10/225,364

(22) Filed: Aug. 21, 2002

(65) Prior Publication Data

US 2003/0038967 A1 Feb. 27, 2003

(30) Foreign Application Priority Data

Aug. 24, 2001 (JP) ............................. 2001-254561

(51) Int. Cl.
G06F 3/12 (2006.01)
G06F 11/00 (2006.01)
H04N 1/00 (2006.01)
H04N 7/173 (2006.01)
H04M 1/64 (2006.01)

(52) U.S. Cl. ...................... 358/1.15; 358/1.9; 358/407; 379/88.11; 379/100.09; 725/112; 714/39

(58) Field of Classification Search ............... 358/1.15, 358/1.13, 1.16, 407; 347/3, 19; 379/29.1, 379/88.11, 100.09

See application file for complete search history.

(56) References Cited

U.S. PATENT DOCUMENTS 6,989,907 B1* 1/2006 Jeyachandran et al. ..... 358/1.15

OTHER PUBLICATIONS

Hitachi Koki Imaging Solutions, Inc. (HiKIS), The Internet Document Controller, "i-copiers and i-printers give dealers the right connections" Office World News. Ft. Lauderdale: Oct. 2000. vol. 28, Iss. 10; p. 30 (2 pages).*

* cited by examiner

Primary Examiner—King Y. Poon
Assistant Examiner—Thomas J. Lett
(74) Attorney, Agent, or Firm—Frishauf, Holtz, Goodman & Chick, P.C.

(57) ABSTRACT

An image forming apparatus in which there are provided a communication means that communicates through a network, a printing means that outputs and image based on image data by forming it on a recording sheet, an inputting means into which information transfer items corresponding to a specific event and an information transfer target address are inputted, a table in which the information transfer items and the information transfer target address are recorded according to the setting inputted from the inputting means, and a control means that controls image forming and controls to transfer the contents of the information transfer items to the formation transfer target address through the network referring to the table, when the specific event is caused.

4 Claims, 6 Drawing Sheets

| EVENT | WITH OR WITHOUT NOTIFICATION | WITH OR WITHOUT CODE | INFORMATION TRANSFER TARGET ADDRESS |
|---|---|---|---|
| DOCUMENT JAM | YES | YES | suzuki@konica.co.jp |
| RECORDING SHEET JAM | YES | YES | suzuki@konica.co.jp |
| RUNNING OUT OF TONER | YES | — | suzuki@konica.co.jp |
| DRUM REPLACEMENT | YES | — | svc@svc.konica.co.jp |
| NO RECORDING SHEET ON UPPER DECK | YES | — | satou@konica.co.jp |
| NO RECORDING SHEET ON MEDIUM DECK | YES | — | satou@konica.co.jp |
| NO RECORDING SHEET ON LOWER DECK | YES | — | satou@konica.co.jp |
| OCCURRENCE OF POWER FAILURE | — | — | — |
| SERVICE CALL | YES | YES | svc@svc.konica.co.jp |
| SERVICE CALL | YES | YES | suzuki@konica.co.jp |
| PERIODIC INSPECTION | YES | — | svc@svc.konica.co.jp |
| REPLACEMENT OF FIXING UNIT | — | — | — |

FIG. 3

| EVENT | WITH OR WITHOUT NOTIFICATION | WITH OR WITHOUT CODE | INFORMATION TRANSFER TARGET ADDRESS |
|---|---|---|---|
| DOCUMENT JAM | YES | YES | suzuki@konica.co.jp |
| RECORDING SHEET JAM | YES | YES | suzuki@konica.co.jp |
| RUNNING OUT OF TONER | YES | — | suzuki@konica.co.jp |
| DRUM REPLACEMENT | YES | — | svc@svc.konica.co.jp |
| NO RECORDING SHEET ON UPPER DECK | YES | — | satou@konica.co.jp |
| NO RECORDING SHEET ON MEDIUM DECK | YES | — | satou@konica.co.jp |
| NO RECORDING SHEET ON LOWER DECK | YES | — | satou@konica.co.jp |
| OCCURRENCE OF POWER FAILURE | — | — | — |
| SERVICE CALL | YES | YES | svc@svc.konica.co.jp |
| SERVICE CALL | YES | YES | suzuki@konica.co.jp |
| PERIODIC INSPECTION | YES | — | svc@svc.konica.co.jp |
| REPLACEMENT OF FIXING UNIT | — | — | — |

FIG. 5 (a)

From : sitios001@office.konica.co.jp
To : suzuki@konica.co.jp
Date : Thu, 18 Jan 2001 17:04:33+0900
Subject : REMOTE MAIL FROM IMAGE FORMING APPARATUS EVENT : OCCURRENCE OF DOCUMENT JAM
CODE : J61
MESSAGE : REMOVE THE JAMMED DOCUMENT
URL : http://office.konica.co.jp

FIG. 5 (b)

From : sitios001@office.konica.co.jp
To : suzuki@konica.co.jp
Date : Thu, 18 Jan 2001 19:04:33+0900
Subject : REMOTE MAIL FROM IMAGE FORMING APPARATUS EVENT : RUNNING OUT OF TONER
MESSAGE : REPLENISH TONER
URL : http://office.konica.co.jp

FIG. 5 (c)

From : sitios001@office.konica.co.jp
To : suzuki@konica.co.jp
Date : Thu, 18 Jan 2001 21:04:33+0900
Subject : REMOTE MAIL FROM IMAGE FORMING APPARATUS EVENT : SERVICE CALL
MESSAGE : MAKE CONTACT WITH SERVICE CENTER
CODE : SC 46-81
URL : http://office.konica.co.jp

FIG. 5 (d)

From : sitios001@office.konica.co.jp
To : svc@svc.konica.co.jp
Date : Thu, 18 Jan 2001 21:04:33+0900
Subject : REMOTE MAIL FROM IMAGE FORMING APPARATUS EVENT : SERVICE CALL
CODE : 46-81
URL : http://office.konica.co.jp

IMAGE FORMING APPARATUS IN USE WITH A NETWORK

BACKGROUND OF THE INVENTION

The present invention relates to an image forming apparatus, and in particular, to an improvement of information transfer that is carried out to a specific communication target when a specific event occurs on an image forming apparatus (a copying machine, a facsimile unit or a printer) connected to a network.

Copying machines, facsimile units and printers (hereinafter referred to as image forming apparatuses as a general term) are connected to a network to be at work, and some of them are provided with a function to communicate the condition of the apparatus main body to a specific communication target (specific user, service center and others) automatically.

On the image forming apparatus equipped with the aforementioned communication function, the specific event determined in advance has been communicated automatically to the specific communication target determined in advance, in the function. However, it has been impossible for the function to decide whether to communicate or not, and to change the items to be communicated and the target for the communication.

Further, it has been impossible for a person who received the communication from the image forming apparatus to confirm the contents of the communication in detail.

SUMMARY OF THE INVENTION

The invention has been achieved in view of the aforementioned problems, and its object is to provide an image forming apparatus wherein, when a specific event caused in the apparatus is communicated to a specific communication target, an item of information transfer and the communication target can be changed freely, and detailed contents of the item to be transferred can be confirmed.

Namely, the inventions to solve the problems stated above are as follows.

(1) The invention is an image forming apparatus wherein there are provided a communication means that communicates through a network, a printing means that outputs an image based on image data by forming it on a recording sheet, an inputting means into which information transfer items corresponding to a specific event and an information transfer target address are inputted, a table in which the information transfer items and the information transfer target address are recorded according to the setting inputted from the inputting means, and a control means that controls image forming and controls to transfer the contents of the information transfer items to the information transfer target address through the network referring to the table, when the specific event is caused.

In the invention mentioned above, information transfer items corresponding to a specific event and an information transfer target address on the network that is determined in connection with the information transfer items are inputted from the inputting means to be established on the table in the image forming apparatus having the function to communicate through the network, and when a specific event is caused, the control means controls to transfer the contents of the information transfer items to the information transfer target address through the network based on the setting on the table.

In this case, setting (information transfer items and an information transfer target address) on the table can be changed freely from the inputting means, and therefore, information transfer items and communication targets among specific communication targets can be changed freely when a specific event occurs in the image forming apparatus.

(2) The invention is an image forming apparatus wherein a display means that conducts various displays is provided, and the control means stated above indicates contents of the information transfer items and the information transfer target address both recorded on the table, and updates contents of the information transfer items and the information transfer target address based on input from the inputting means.

In the invention mentioned above, contents of the information transfer items and the information transfer target address both recorded on the table are displayed, and contents of the information transfer items and the information transfer target address are updated based on the input from the inputting means.

In this case, since the setting (information transfer items and the information transfer target address) on the table can be changed freely from the inputting means while referring to the display of the setting which has already been established, it is further possible to change easily and freely information transfer items for a specific communication target and the communication target when a specific event is caused on the image forming apparatus.

(3) The invention is an image forming apparatus wherein the control means updates the contents of the information transfer target address for each information transfer item in accordance with an input from the inputting means.

In the invention mentioned above, contents of the information transfer target address are updated for each information transfer item in accordance with an input from the inputting means in the aforesaid item (2).

In this case, since the contents of the information transfer target address can be changed freely for each information transfer item, it is further possible to change more easily and freely the information transfer items for a specific communication target and the communication target so that the communication target may correspond the item, when a specific event is caused on the image forming apparatus.

(4) The invention is an image forming apparatus wherein, when a specific event is caused, an internal code corresponding to the event is also transferred simultaneously with transfer of contents of the information transfer items.

In the invention mentioned above, when a specific event is caused in the aforesaid items (1)–(3), an internal code corresponding to the event is also transferred simultaneously with transfer of contents of the information transfer items.

In this case, since the internal code is transferred together with the information transfer items, it is possible to change freely the information transfer items to a specific communication target and the communication target in the case of occurrence of the specific event, and it is also possible for the side who received the communication to confirm the detailed contents of the transferred items.

(5) The invention is an image forming apparatus wherein, Web server for indicating the state of the apparatus is provided in the apparatus, and when a specific event is caused, the control means transfers also URL of the Web server simultaneously with transfer of contents of the information transfer items.

In the invention mentioned above, Web server for indicating the state of the apparatus is provided in the apparatus, and when a specific event is caused, URL of the Web server is also transferred simultaneously with transfer of the information transfer items, in the aforesaid items (1)–(4).

In this case, since URL of Web server in the apparatus is also transferred together with the information transfer items, it is possible to change freely the information transfer items to a specific communication target and the communication target in the case of occurrence of the specific event, and it is also possible for the side who received the communication to confirm the detailed contents of the transferred items.

(6) The invention is an image forming apparatus wherein, the common table is consulted by the Web server and the control means with respect to the state of the apparatus.

In the invention mentioned above, Web server for indicating the state of the apparatus is provided in the apparatus, and the Web server and the control means operate to consult with the common table.

In this case, since the control means and the Web server read the state of the apparatus from the common table to conduct information transfer or to conduct an announcement by the Web, it is possible to let the surroundings know the state of equipment accurately.

BRIEF DESCRIPTION OF THE DRAWINGS

FIG. 3 is an illustration showing the state of the table in the image forming apparatus in the first embodiment of the invention.

FIGS. 5(a) to 5(d) are illustrations showing the state of information transfer of the image forming apparatus in the first embodiment of the invention.

DETAILED DESCRIPTION OF THE INVENTION

Figure 1:
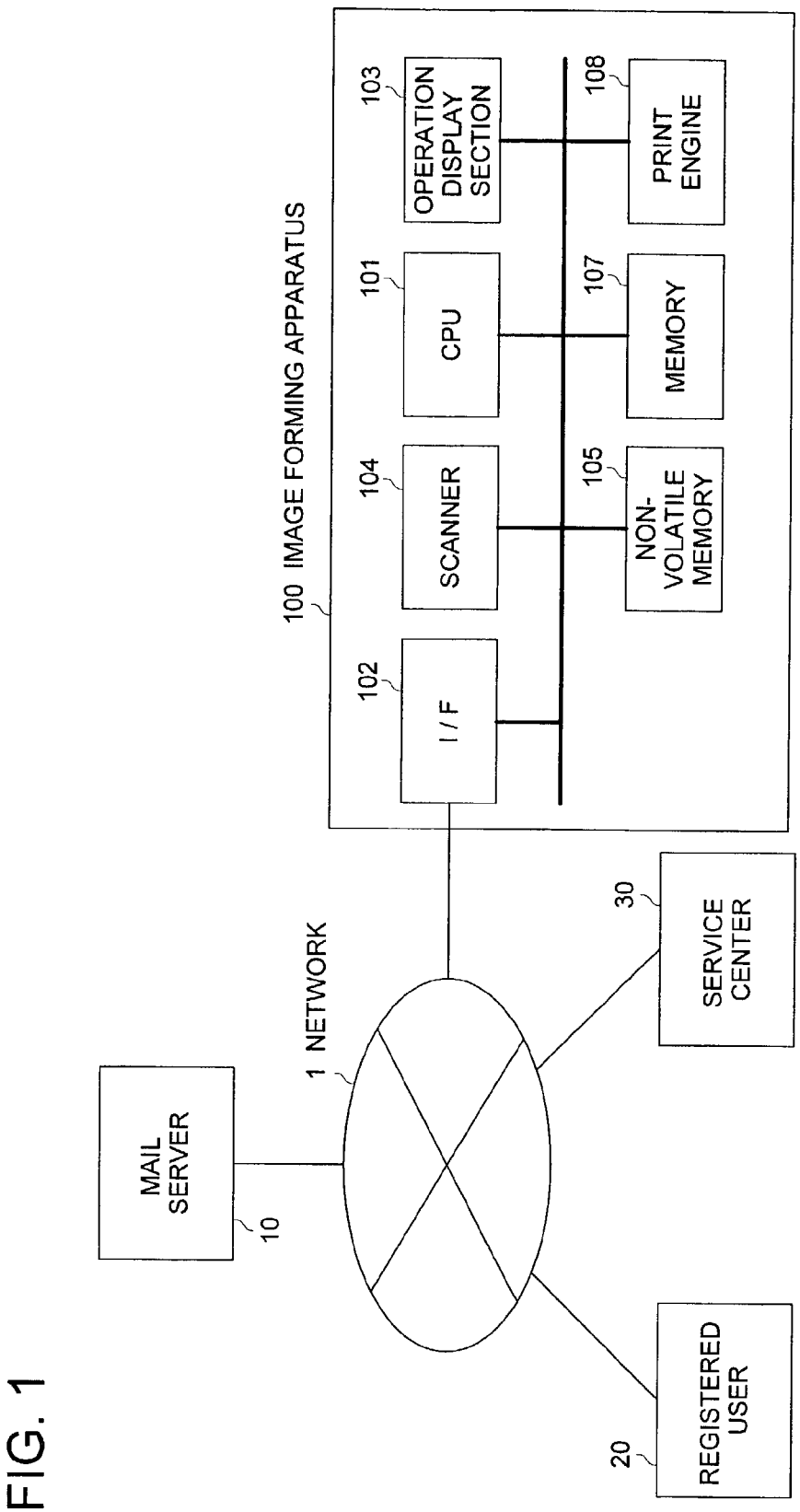
FIG. 1 is a functional block diagram showing the electric structure of an image forming apparatus in the first embodiment of the invention.

Embodiments of the invention will be explained in detail as follows, referring to the drawings.

(First Embodiment)

FIG. 1 is a block diagram showing the structure of the first embodiment of the invention. In the drawing, the numeral 1 represents a network which is connected with at least a mail server described later, a registered user and an image forming apparatus, and can conduct data communication. Incidentally, this network 1 includes various types of networks such as LAN, WAN, intranet and Internet.

The numeral 10 represents a mail server that is connected to the network 1 to execute sending/receiving of various types of mails about image forming apparatus 100. In the present embodiment, mail server 10 conducts at least transmission of the mail requested by image forming apparatus 100.

The numeral 20 represents a registered user who is registered as an administrator for image forming apparatus 100 that works through network 1. Incidentally, "registered user" mentioned in this case actually means "computer used by the registered user".

The numeral 100 represents an image forming apparatus having therein a function to conduct output by means of image forming for image data obtained from a computer through the network 1 or image data obtained through reading by a built-in scanner, a function to communicate with mail server 10 connected to the network 1, a function to receive an information transfer item corresponding to the specific event and an information transfer target address on the network determined to correspond to the information transfer item from an operation input section and to set on the table on a non-volatile memory, and a function to notify contents of the information transfer item to registered user 20 or to service center 30 when a specific event is caused.

In the image forming apparatus 100, the numeral 101 represents CPU serving as a control means that controls each section, 102 represents interface (I/F) serving as a communication means that conducts communication through the network 1, 103 represents an operation display section through which various operations of the apparatus are inputted and various displays are conducted, 104 represents a scanner that reads an image on a document and generates image data, 105 represents a non-volatile memory serving as a table for storing thereon various data and established values of the image forming apparatus 100, 107 represents a memory that conducts development of image data and temporally storage of various types of data in the course of image forming and 108 represents a print engine that outputs an image by forming it on a recording sheet.

Incidentally, in this case, memory 107 may also be a hard disc device, without being limited to a semiconductor memory. Further, the non-volatile memory 105 is supposed to store information such as e-mail address (information transfer target address) of registered user 20 or service center 30 and presence or absence of items for which information is transferred from the image forming apparatus (information transfer items).

Image forming apparatus 100 connected to network 1 is represented by various apparatuses including a copying machine, a facsimile unit and a printer. Print engine 108 may also be one employing an LED print head or one that is of an ink jet type, in addition to an electrophotographic one employing a laser beam.

Operations in the image forming apparatus stated above will be explained as follows, referring to FIG. 2. Incidentally, a flow chart shown in FIG. 2 represents a subroutine called by a main routine at prescribed intervals, and it is one called in the image forming control program operated by CPU101.

Incidentally, in the explanation of operations in the following embodiment, controls and operations by CPU101 and by a sub-routine of the image forming program are simply called controls by CPU101.

Figure 2:
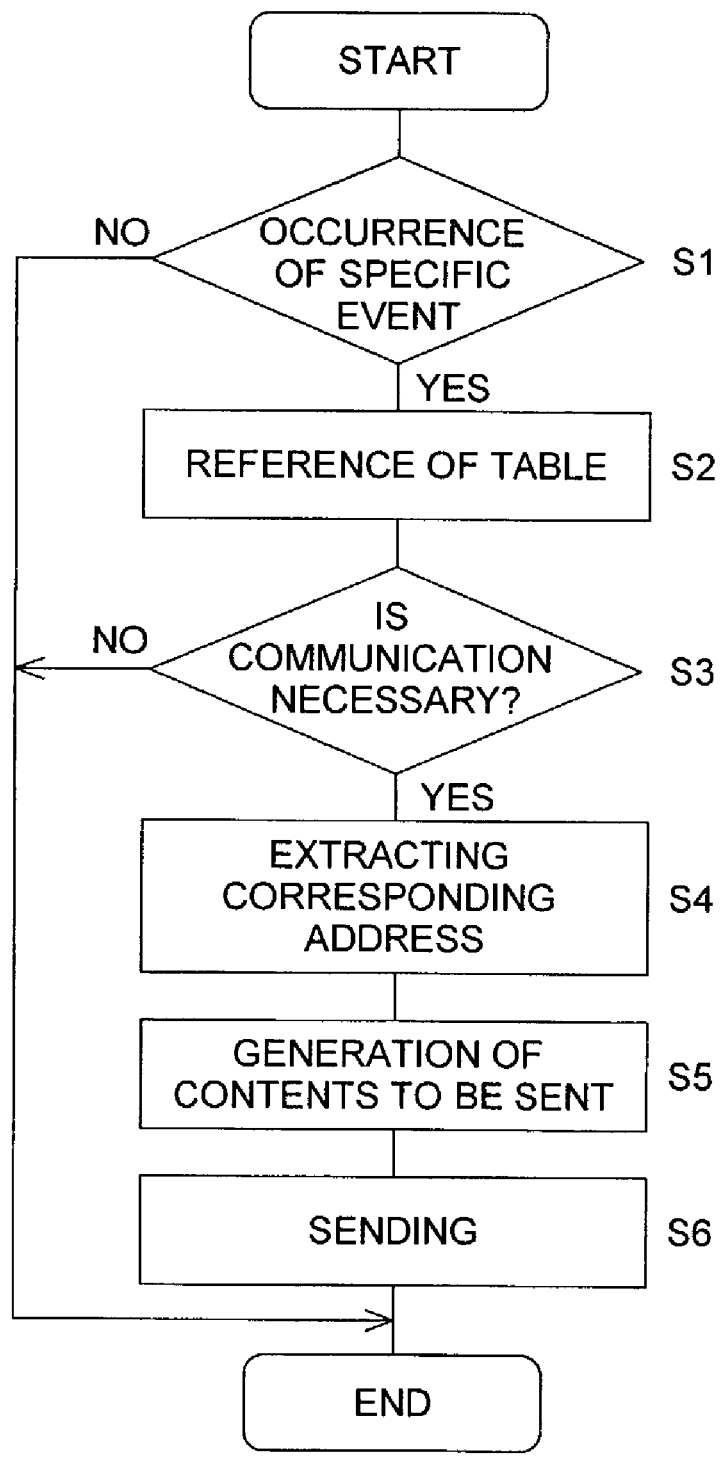
FIG. 2 is a flow chart showing operations of the image forming apparatus in the first embodiment of the invention.

In this sub-routine, CPU101 monitors signals from various sensors housed in the apparatus to watch whether a specific event requiring a certain processing is caused or not (FIG. 2 S1).

The specific event in this case is an event that requires a display on operation display section 103 for notifying a user or a service engineer of that a prescribed measure is necessary, or requires transfer of information transfer items to a specific communication target, and examples thereof include document jam, recording sheet jam, running-out of toner, drum replacement, absence of recording sheet, occurrence of power failure, service call, arrival of periodic check and notification of job end.

If these events can be notified selectively to optional targets of notification by the operation display section 103, various merits are exhibited. For example, in the case of "notification of job end", if there is kept the state capable of notifying, in the case of forming a large amount of images, it is possible to leave the image forming apparatus in operation and thereby to wait, at a remote location, the "job end notification" by e-mail, which is convenient. However, if this notifying function is kept to be possible to notify constantly, on the other hand, it notifies each time an image is formed, which is rather troublesome. Therefore, the function capable of changing possible/impossible and the target for notification selectively at need is an important function for making use of the notifying function by e-mail relating to the event of the image forming apparatus, in a form suitable for the actual circumstances of utilization.

When an outbreak of such specific event as the foregoing is detected successively (YES in FIG. 2 S1), CPU101 checks the event by referring to the table on non-volatile memory 105 (FIG. 2 S2).

In this case, necessity of notification, necessity of appending of internal code in the apparatus and information transfer target address (e-mail address in the case of an occasion by e-mail) are set on non-volatile memory 105 as an information transfer item for each event, as shown in FIG. 3.

Figure 4A:
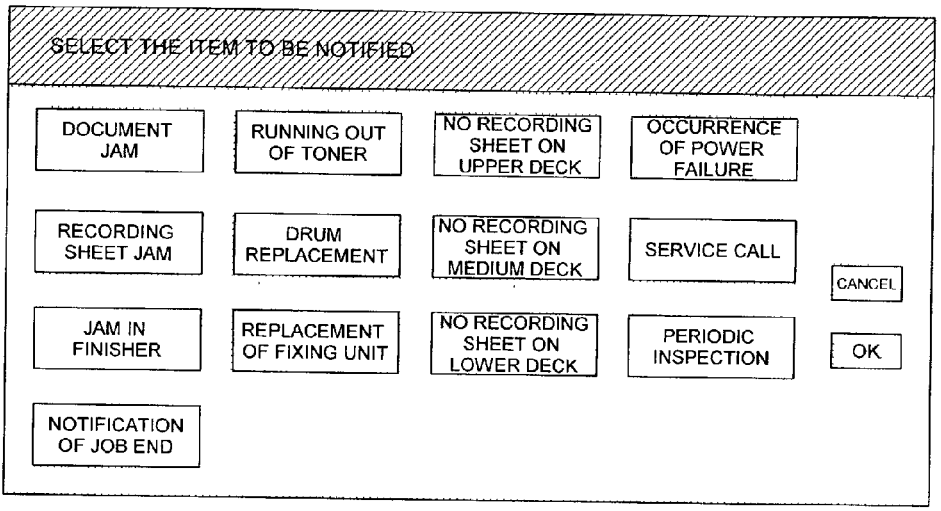
FIGS. 4(a) to 4(c) are illustrations showing the state of information transfer items and setting of the information transfer target address in the image forming apparatus in the first embodiment of the invention.
Figure 4B:
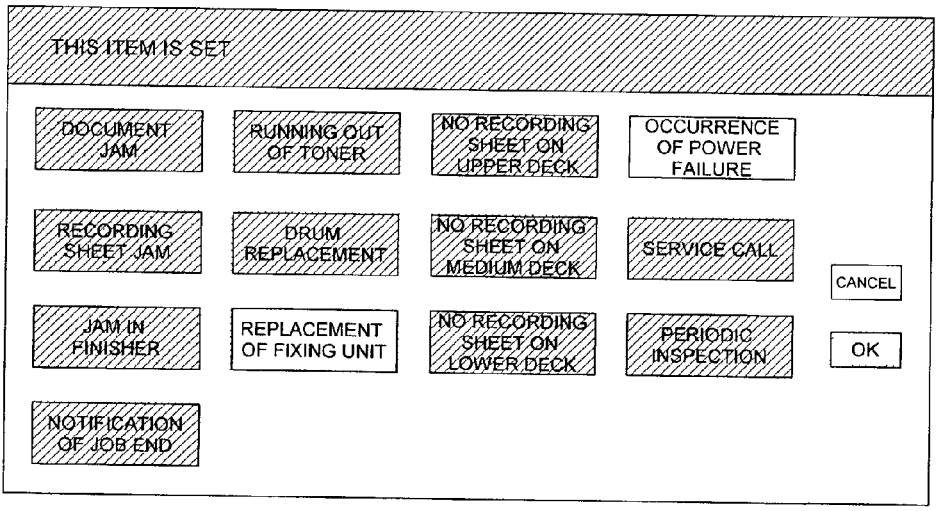
Figure 4C:
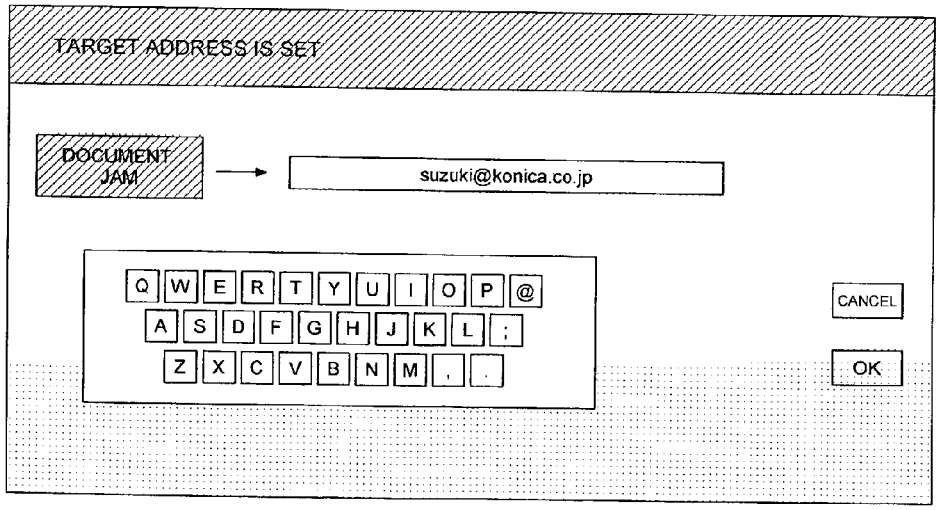

Incidentally, it is preferable that contents of information transfer items and information transfer target address can be updated by an input from operation inputting section 103. In this case, if the operation inputting section 103 is a means capable of displaying and inputting under the touch-panel mode, it is preferable that it is possible to select for each item as shown in FIGS. 4(*a*) and 4(*b*). In this case, a display of a certain portion to be selected is pressed down concerning information transfer items displayed on operation display section 103 as shown in FIG. 4(*a*), so that the display may be reversed as shown in FIG. 4(*b*), and then, "OK" is pressed to confirm.

Due to this, the items to be transferred for registered user 20 and service center 30 among information transfer items are stored in non-volatile memory 105 (corresponding to "YES" in the column of "with or without notification).

On the other hand, the item which is not selected in FIG. 4(*b*) and is not transferred for registered user 20 or service center 30 among information transfer items corresponds to "-" in the column of "with or without notification). In this case, there is shown an example wherein the items for power failure and replacement of fixing unit are set not to be notified even when the event is caused.

Further, it is also preferable that contents of the information transfer target address can be updated for each information transfer item as shown in FIG. 4(*c*). By doing this, it is possible to change the communication target based on the contents thereof, and for example, it is also possible to use a right communication target for a right occasion, as in the example that a user who knows well about operations of the apparatus is a communication target in the occasion of a document jam or a recording sheet jam, while, a user who is closest to the apparatus is a communication target in the occasion of a absence of recording sheet. In the examples shown in FIG. 3 and FIG. 4(*c*), communication targets are divided to be set individually, as in the example that <suzuki@konica.co.jp> is a communication target for document jam, <satou@konica.co.jp> is a communication target for absence of recording sheet, and both of <suzuki@konica.co.jp> and <svc@svc.konica.co.jp> of service center 30 represent a communication target for service call.

When CPU101 refers to the table on non-volatile memory 105 to check an event thereon, if the contents of the information transfer item need to be transferred to information transfer target address through a network (YES in FIG. 2 S3, "YES" in the column of "with or without notification" in FIG. 3), information transfer target address (e-mail address) corresponding to the event is read out of the table (FIG. 2 S4).

Then, CPU101 prepares a message to be transmitted to the information transfer target address (FIG. 2 S5). In this case, there is prepared a message to be transmitted including the contents of the event in process of occurrence (document jam, recording sheet jam, running-out of toner, drum replacement, absence of recording sheet, service call, arrival of periodic check and notification of job end), and internal code, if necessary. Incidentally, the internal code in this case means a code determined in advance to show the contents of the event in detail, and an example thereof is one that can specifies the location of occurrence of the event and symptom.

For example, in the case of a document jam, the information transfer target address generates a message to be transmitted in the state having an internal code for <suzuki@konica.co.jp> representing a registered user, as shown in FIG. 3. An example of the message to be transmitted thus generated is shown in FIG. 5(*a*). In this case, internal code "J61" showing a document jam is added. Incidentally, in this case, an address of the image forming apparatus 100 is represented by <sitios001@mozu9.konica.co.jp> as an example.

Further, in the case of running-out of toner, the information transfer target address generates a message to be transmitted in the state having no internal code for <suzuki@konica.co.jp> representing a registered user, as shown in FIG. 3. An example of the message to be transmitted thus generated is shown in FIG. 5(*b*).

Further, in the case of a service call, the information transfer target address generates a message to be transmitted in the state having an internal code for <suzuki@konica.co.jp> representing a registered user and <svc@svc.konica.co.jp> of service center 30, as shown in FIG. 3. An example of the message to be transmitted thus generated is shown in FIG. 5(*c*) and FIG. 5(*d*). In this case, internal code "SC46-81" showing a service call is added.

Then, CPU101 that has generated a message to be transmitted corresponding to each event stated above transmits the message to be transmitted to registered user 20 or service center 30 in the form of an e-mail through mail server 10 on network 1 (S6 in FIG. 2). Incidentally, in this case, transmission in the form of an e-mail through mail server 10 corresponds to "transfer of contents of information transfer item to an information transfer target address through a network".

Incidentally, if a mail server (not shown) is provided in image forming apparatus 100, in place of mail server 10, it is also possible to transmit e-mail by using the mail server in the image forming apparatus.

As stated above, setting (information transfer item and information transfer target address) of a table on non-volatile memory 105 can be changed freely from operation display section 103. Therefore, it is possible to change freely an information transfer item to be transferred to a specific communication target in the case of occurrence of a specific event on an image forming apparatus and to change freely the communication target.

As stated above, setting (information transfer item and information transfer target address) of the table on non-volatile memory 105 can be changed freely from operation display section 103, while referring to the display of setting that has already been made as a display screen, and therefore, it is possible to change freely and more easily the information transfer item to be transferred to a specific communication target in the case of occurrence of a specific event on the image forming apparatus and to change the communication target.

Further, since it is possible to set an information transfer item to be transferred to a specific communication target in the case of occurrence of a specific event and a communication target individually so that the communication target may be the right one for the item, as stated above, contact may be made with an appropriate communication target. Further, since both A and B can be transferred as stated above, it is possible for the side receiving the contact to confirm the detailed contents of the item transferred.

(Second Embodiment)

Figure 6:
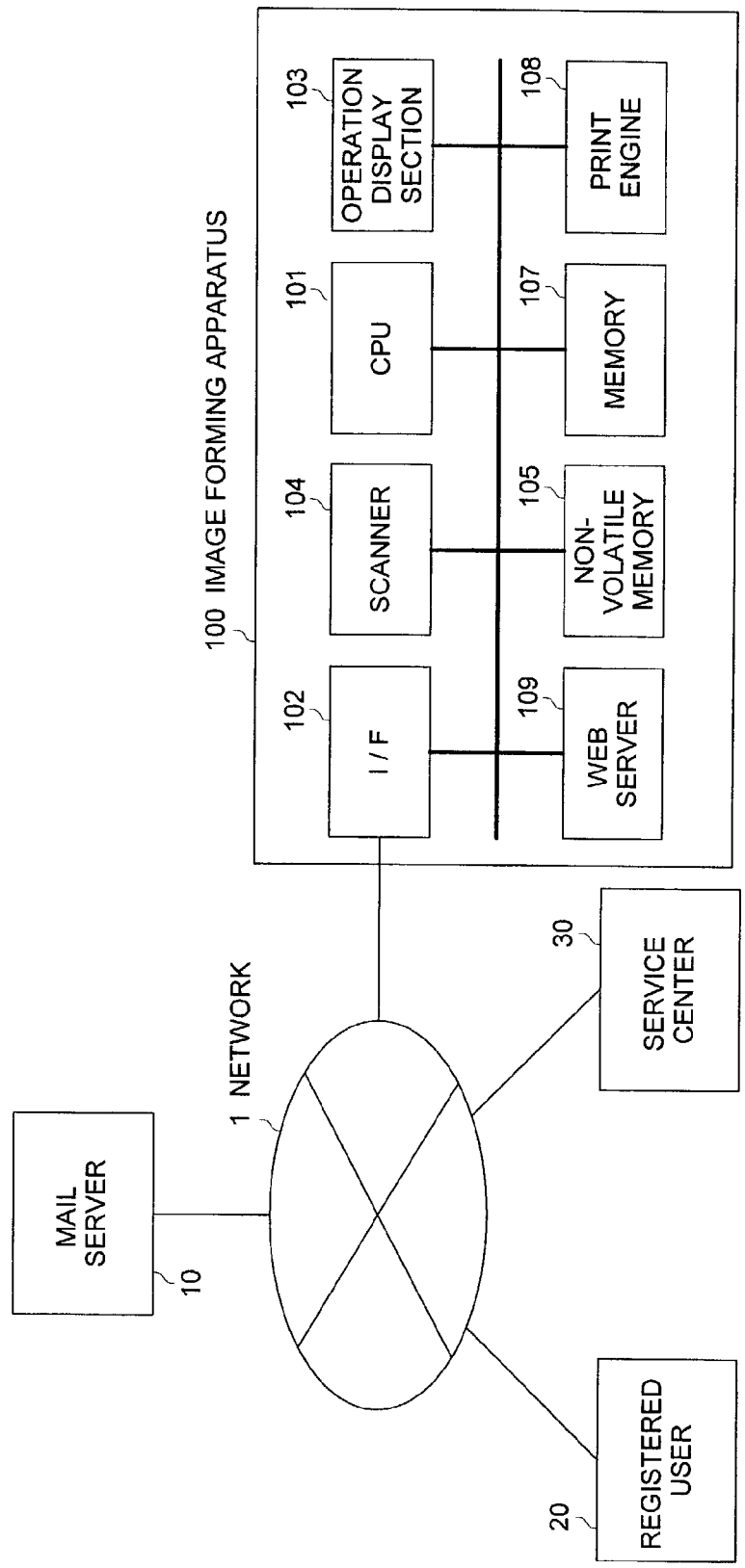
FIG. 6 is a functional block diagram showing the electric structure of an image forming apparatus in the second embodiment of the invention.

FIG. 6 is a block diagram showing the structure of the second embodiment of the invention. In the drawing, what is different from FIG. 1 is that Web server 109 is housed in image forming apparatus 100. With respect to portions other than the foregoing, the structure and operations are the same as those in the first embodiment which has already been explained.

The numeral 109 represents Web server that provides browsing service for browsing the state of image forming apparatus 100 as Web page. Owing to the Web server 109, it is also possible to conduct setting of the image forming apparatus (setting of information transfer items in the table on non-volatile memory 105 and of information transfer target address) from the computer on network 1.

In the second embodiment, Web server 109 is controlled by CPU101. Namely, based on the contents of setting on the table on non-volatile memory 105, there are made display and generation of message to be transmitted on both Web page of Web server 109 and display screen of operation display section 103.

With regard to the contents of setting on the table on non-volatile memory 105, setting or change is conducted either by operations on a Web page of the Web server 109 or by operations on the operation display section 13.

Further, on the Web server 109, there may be displayed detailed state which cannot be displayed on the operation display section 13.

In this case, in the message to be transmitted shown in FIG. 5, there is described URL of Web server. URL in this case is an abbreviation of Uniform Resource Locator which is a method of inscribing a location of service on the network, in which a schema-name (access method), a server name (domain name) and a pathname are inscribed side by side.

In the case of the second embodiment, URL of Web server in the apparatus is transferred together with information transfer items as shown in FIG. 5. Therefore, it is possible to change freely information transfer items to be transferred to a specific communication target when a specific event occurs and the communication target, and it is further possible for the side (registered user 20 or service center 30) receiving the contact to confirm the detailed contents of the item transferred, by referring to Web page provided by Web server 109.

Further, in this case, information transfer or publication by Web is based on common data, and thereby, the state of equipment can be made known accurately to the surroundings, because Web server 109, operation display section 103 and message to be transmitted by e-mail are based on data from the common table on the non-volatile memory 105.

(Other Embodiments)

Incidentally, in each embodiment explained above, a concrete example of image forming apparatus 100 was represented by a copying machine which can be connected to network 1. However, the invention can be applied also to image forming apparatuses (printer, facsimile unit and compound machine) other than the copying machine, provided that the image forming apparatus can be used through connection to network 1.

As explained in detail above, effects enumerated below are exhibited by the invention.

(1) In the image forming apparatus of the invention having a function to communicate through a network, information transfer items corresponding to specific events and addresses of targets for information transfer on the network determined to correspond to the information transfer items are inputted from an inputting means to be established on a table, and when a specific event is caused, a control means controls so that the contents of the information transfer item may be transferred to the information transfer target address through the network, based on establishment on the table. In this case, the establishment on the table (information transfer item and information transfer target address) can be changed freely from the inputting means, and therefore, an information transfer item for a specific communication target in the case of occurrence of specific event in an image forming apparatus and a communication target can be changed freely.

(2) In the invention, contents of the information transfer item and information transfer target address recorded in the table are displayed in the aforesaid effect (1), and the contents of the information transfer item and information transfer target address are updated by input from an inputting means. In this case, information transfer items to be transferred to a specific communication target in the case of occurrence of a specific event on the image forming apparatus and the communication target can be changed more easily and freely, because setting (the information transfer item and information transfer target address) of the table can be changed freely from the inputting means by referring to displays of the setting which has already been made.

(3) In the invention, contents of the information transfer target address are updated for each information transfer item based on the input from the inputting means in the effect (2) above. In this case, information transfer items to be transferred to a specific communication target in the case of occurrence of a specific event on the image forming apparatus and the communication target can be changed more easily and freely so that the communication target may match with the information transfer item, because the contents of the information transfer target address can be changed freely for each image transfer item by referring to displays of the setting which has already been made.

(4) In the invention, when a specific event occurs, contents of the information transfer item are transferred and an internal code corresponding to the event is also transferred simultaneously, in the effects (1)–(3) above. In this case, information transfer items to be transferred to a specific communication target in the case of occurrence of a specific event and the communication target can be changed freely and it is possible for the side receiving the contact to confirm the detailed contents of the item transferred, because the information transfer item and the internal code are transferred.

(5) In the invention, a Web server for indicating the state of the apparatus is provided in the apparatus, and when a specific event occurs, information transfer items as well as URL of the Web server are transferred, in the effects (1)–(4) above. In this case, information transfer items to be transferred to a specific communication target in the case of occurrence of a specific event and the communication target can be changed freely and it is possible for the side receiving the contact to confirm the detailed contents of the item transferred, because the information transfer item and URL of the Web server in the apparatus are transferred.

(6) In the invention, a Web server for indicating the state of the apparatus is provided in the apparatus, and the Web server and a control means operate to refer to the common table in the effect (5) above. In this case, it is possible to let the surroundings know the state of equipment accurately, because the control means and the Web server read the state of the apparatus from the common table to conduct information transfer or to conduct an announcement by the Web.

What is claimed is:

1. An image forming apparatus system, including an image forming apparatus comprising:

communication means for communicating through a network;

printing means for forming an image on a recording sheet in accordance with image data so as to output said image;

inputting means for inputting information transfer items corresponding respectively to a plurality of specific events and for inputting an information transfer target address on said network to correspond to one of the specific events;

a table for recording a plurality of settings inputted via said inputting means, each said setting corresponding to one of the specific events and comprising the information transfer target address corresponding individually to said one of the specific events and the information transfer item corresponding said one of the specific events;

control means for controlling an image forming operation of said printing means and for, when one of the specific events occurs, referring to said table and controlling transfer of contents of the information transfer item corresponding to said one of the specific events to said information transfer target address corresponding to said one of the specific events; and display means for displaying various displays;

wherein said control means indicates said information transfer items and said information transfer target address, both recorded on said table via said display means, and updates said information transfer items and said information transfer target address in accordance with input from said inputting means via said display means;

wherein when one of the specific events occurs, an internal code corresponding to the specific event is transferred simultaneously with said information transfer item corresponding to the specific event; and further comprising a web server for indicating a state of said image forming apparatus, wherein when one of the specific events occurs, said control means transfers a URL of said web server simultaneously with said information transfer item corresponding to the specific event.

2. The image forming apparatus system of claim 1, wherein said web server and said control means commonly refer to said table with respect to said state of said apparatus.

3. An image forming apparatus system, including an image forming apparatus comprising:

a communication section which communicates through a network;

a printing section which forms an image on a recording sheet in accordance with image data so as to output said image;

an inputting section which inputs information transfer items corresponding respectively to a plurality of specific events and which inputs an information transfer target address on said network to correspond to one of the specific events;

a table which records a plurality of settings inputted via said inputting section, each said setting corresponding to one of the specific events and comprising the information transfer target address corresponding individually to said one of the specific events and the information transfer item corresponding to said one of the specific events;

a controller which controls an image forming operation of said printing section and which, when one of the specific events occurs, refers to said table and controls transferring of contents of said information transfer item corresponding to said one of the specific events to said information transfer target address corresponding to said one of the specific events; and a display;

wherein said controller indicates said information transfer items and said information transfer target address, both recorded on said table via said display, and updates said information transfer items and said information transfer target address in accordance with input from said inputting section via said display;

wherein when one of the specific events occurs, an internal code corresponding to the specific event is transferred simultaneously with said information transfer item corresponding to the specific event; and further comprising a web server for indicating a state of said image forming apparatus, wherein when one of the specific events occurs, said controller transfers a URL of said web server simultaneously with said information transfer item corresponding to the specific event.

4. The image forming apparatus system of claim 3, wherein said web server and said controller commonly refer to said table with respect to said state of said apparatus.

* * * * *